(12) United States Patent
Williams et al.

(10) Patent No.: US 9,616,920 B2
(45) Date of Patent: *Apr. 11, 2017

(54) POWER STEERING APPARATUS

(71) Applicant: TRW Automotive U.S. LLC, Livonia, MI (US)

(72) Inventors: Daniel E. Williams, Lebanon, IN (US); Amine Nhila, Lafayette, IN (US)

(73) Assignee: TRW Automotive U.S. LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/415,209

(22) PCT Filed: Sep. 13, 2013

(86) PCT No.: PCT/US2013/059647
§ 371 (c)(1),
(2) Date: Jan. 16, 2015

(87) PCT Pub. No.: WO2014/043460
PCT Pub. Date: Mar. 20, 2014

(65) Prior Publication Data
US 2015/0183459 A1    Jul. 2, 2015

Related U.S. Application Data

(63) Continuation-in-part of application No. 13/613,060, filed on Sep. 13, 2012.

(51) Int. Cl.
B62D 5/06        (2006.01)
B62D 5/065       (2006.01)
(Continued)

(52) U.S. Cl.
CPC ............ B62D 5/065 (2013.01); B62D 5/063 (2013.01); F04C 2/3446 (2013.01);
(Continued)

(58) Field of Classification Search
CPC ... B62D 5/09; B62D 6/02; B62D 5/07; B62D 5/083
(Continued)

(56) References Cited

U.S. PATENT DOCUMENTS 2,280,272 A     4/1942  Sullivan
3,584,537 A  *  6/1971  Schulz .................... B62D 5/32
                                                                180/432
(Continued)

FOREIGN PATENT DOCUMENTS

DE       102011001552       12/2011

*Primary Examiner* — Joseph Rocca
*Assistant Examiner* — Conan Duda
(74) *Attorney, Agent, or Firm* — Tarolli, Sundheim, Covell & Tummino LLP

(57) ABSTRACT

An apparatus for use in turning steerable vehicle wheels includes a power steering motor assembly connected with the steerable vehicle wheels. A first pump connected with the power steering motor assembly is continuously driven by an engine of the vehicle, during operation of the engine, to supply fluid under pressure to the power steering motor assembly. A second pump connected with the power steering motor assembly is continuously driven by an engine of the vehicle, during operation of the engine. A valve connected with the power steering motor assembly and the second pump directs fluid flow from the second pump to at least one of the power steering motor assembly and reservoir during operation of both the first pump and the second pump. A pumping mechanism includes a first pumping area defining the first pump and a second pumping area defining the second pump. The first pumping area is smaller than the second pumping area.

13 Claims, 8 Drawing Sheets

(51) Int. Cl.
  *F04C 2/344* (2006.01)
  *F04C 11/00* (2006.01)
  *F04C 14/02* (2006.01)
  *F04C 14/26* (2006.01)
(52) U.S. Cl.
  CPC ............ *F04C 11/001* (2013.01); *F04C 14/02* (2013.01); *F04C 14/26* (2013.01); *F04C 2240/10* (2013.01); *F04C 2250/30* (2013.01)
(58) Field of Classification Search
  USPC .................... 180/417, 421, 432, 441, 442
  See application file for complete search history.

(56) References Cited

U.S. PATENT DOCUMENTS

| | | | |
|---|---|---|---|
| 4,183,723 A | 1/1980 | Hansen et al. | |
| 4,586,581 A | 5/1986 | Shibahata et al. | |
| 4,768,605 A * | 9/1988 | Miller | F04C 14/26 180/421 |
| 4,798,256 A * | 1/1989 | Fassbender | B62D 5/32 180/403 |
| 5,135,068 A * | 8/1992 | Emori | B62D 6/02 180/421 |
| 5,257,670 A * | 11/1993 | Miller | B62D 5/32 180/405 |
| 6,352,415 B1 * | 3/2002 | Uchino | F04C 14/226 417/220 |
| 6,619,928 B2 * | 9/2003 | Konishi | F04C 14/226 417/213 |
| 6,881,165 B2 | 4/2005 | Endo et al. | |
| 7,094,044 B2 * | 8/2006 | Strueh | F01C 21/0863 418/268 |
| 7,510,044 B2 | 3/2009 | Williams | |
| 7,832,995 B2 * | 11/2010 | Yamamuro | F01C 21/108 29/888.025 |
| 7,837,001 B2 | 11/2010 | Young et al. | |
| 8,348,635 B2 * | 1/2013 | Yamashita | F04C 2/18 417/205 |
| 8,597,002 B2 | 12/2013 | Mathers | |
| 8,651,224 B2 * | 2/2014 | Noah | B62D 5/065 180/421 |
| 8,662,241 B2 * | 3/2014 | Noah | B62D 5/063 180/421 |
| 2002/0029801 A1 * | 3/2002 | Guo | F04C 14/26 137/115.07 |
| 2006/0133946 A1 * | 6/2006 | Mathers | F01C 21/0863 418/112 |
| 2006/0196720 A1 * | 9/2006 | Zahniser | B62D 5/065 180/442 |
| 2007/0212243 A1 * | 9/2007 | Yamamuro | F04C 2/3442 418/30 |
| 2009/0208358 A1 | 8/2009 | Yamashita et al. | |
| 2009/0280021 A1 * | 11/2009 | Mathers | F01C 21/0818 418/184 |
| 2013/0175111 A1 * | 7/2013 | Blond | B62D 5/063 180/423 |
| 2013/0341116 A1 * | 12/2013 | Strueh | B62D 5/063 180/432 |

* cited by examiner

POWER STEERING APPARATUS

RELATED APPLICATIONS

This application corresponds to PCT/US2013/059647, filed Sep. 13, 2013, which is a continuation-in-part application of U.S. patent application Ser. No. 13/613,060, filed Sep. 13, 2012, the subject matter of which is incorporated herein by reference in its entirety.

BACKGROUND OF THE INVENTION

The present invention is directed to an apparatus for use in turning steerable vehicle wheels.

In a known power steering system, an engine driven pump provides a fixed volume of fluid output per revolution during operation of the pump. Therefore, the rate of flow of fluid from the engine driven pump is proportional to engine speed. The pump in this known power steering system is sized to provide an acceptable rate of fluid flow when the engine is idling.

A known power steering motor assembly has an open center valve which requires a constant rate of fluid flow, independently of engine speed. In order to obtain a constant rate of fluid flow independently of engine speed, a known power steering system utilizes a flow control valve having a spring loaded valve spool which is moved to maintain a constant pressure drop across a control orifice.

SUMMARY OF THE INVENTION

The present invention is directed to an apparatus for use in turning steerable vehicle wheels including a power steering motor assembly connected with the steerable vehicle wheels. A first pump connected with the power steering motor assembly is continuously driven by an engine of the vehicle, during operation of the engine, to supply fluid under pressure to the power steering motor assembly. A second pump connected with the power steering motor assembly is continuously driven by an engine of the vehicle, during operation of the engine. A valve connected with the power steering motor assembly and the second pump directs fluid flow from the second pump to at least one of the power steering motor assembly and reservoir during operation of both the first pump and the second pump.

In another aspect of the present invention, a pumping mechanism includes a rotor having vanes located in slits in the rotor. A cam ring engages the vanes. The cam ring includes a first generally semicircular portion with a first interior elliptical surface and a second generally semicircular portion with a second interior elliptical surface. The first interior elliptical surface is spaced from a center of the rotor a first distance. The second interior elliptical surface is spaced from a center of the rotor a second distance larger than the first distance. The first elliptical surface defining a first pumping area and the second elliptical surface defining a second pumping area.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF EXEMPLARY EMBODIMENTS

Figure 1:
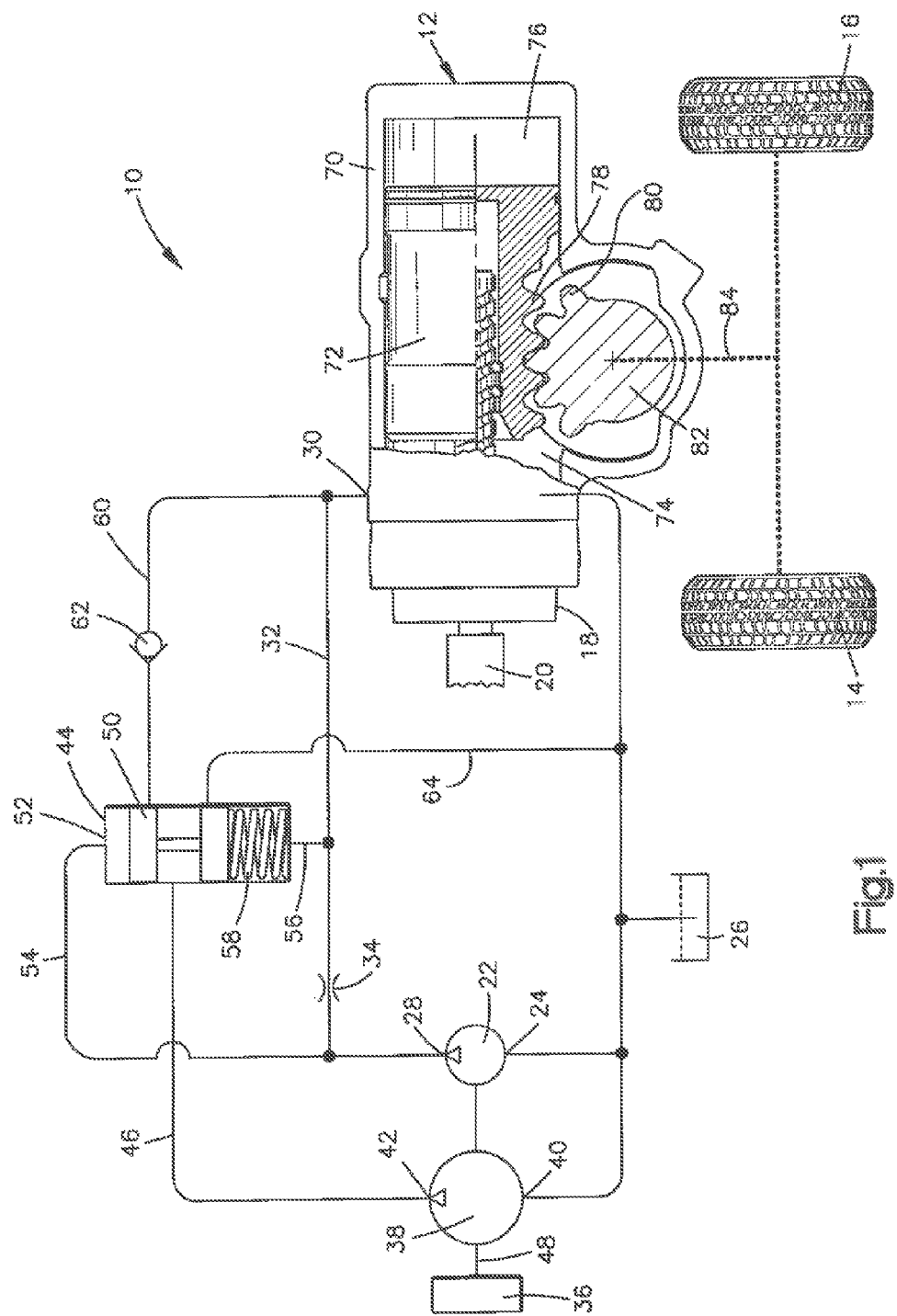
FIG. 1 is a schematic illustration of a first exemplary embodiment of a power steering apparatus constructed and operated in accordance with the present invention.

A vehicle steering apparatus 10 constructed in accordance with a first exemplary embodiment of the present invention is illustrated in FIG. 1. The vehicle steering apparatus 10 includes a hydraulic power steering motor assembly 12 which is connected with steerable vehicle wheels 14 and 16. A steering control valve 18 is connected with the power steering motor assembly 12. The steering control valve 18 has an input shaft 20 which is connected with a manually rotatable vehicle steering wheel (not shown). The steering control valve 18 may be an open center control valve.

A first pump 22 has a fluid input 24 connected in fluid communication with a fluid reservoir 26. A fluid output 28 of the first pump 22 is connected in fluid communication with a fluid inlet 30 of the steering control valve 18 by a fluid supply conduit 32. The fluid output 28 is in fluid communication with an upstream side of a fixed area control orifice 34 in the fluid supply conduit 32. The first pump 22 is continuously driven by an engine 36 of the vehicle, during operation of the engine. Therefore, during operation of the engine 36, the pump 22 continuously supplies fluid under pressure to the power steering motor assembly 12.

A second pump 38 has a fluid input 40 connected in fluid communication with the fluid reservoir 26. A fluid output 42 of the second pump 38 is connected in fluid communication with a valve 44 by a conduit 46. The second pump 38 is continuously driven by the engine 36 of the vehicle, during operation of the engine. It is contemplated that the first and second pumps 22 and 38 may be mounted on the same output shaft 48 of the engine 36. Therefore, the first and second pumps 22 and 38 are driven at the same speed, which is the speed of the engine 36.

A valve spool 50 moves in a housing 52 of the valve 44 under the influence of fluid pressure conducted from an upstream side of the control orifice 34 by a conduit 54. Similarly, the valve spool 50 moves in the housing 52 under the influence of fluid pressure conducted from a downstream side of the control orifice 34 by a conduit 56. The fluid pressure conducted through the conduit 56 and applied to the lower (as viewed in FIG. 1) end portion of the valve spool 50, is assisted by a biasing spring 58 disposed between a lower end portion of the housing 52 and the valve spool.

The valve 44 directs fluid from the second pump 38 to the fluid inlet 30 of the steering control valve 18 through a conduit 60. The conduit 60 includes a check valve 62. The valve 44 also directs fluid from the second pump 38 to the reservoir 26 through a conduit 64. The amount of fluid directed to the control valve 18 and the reservoir 26 is determined by the position of the spool 50 in the housing 52 of the valve 44. The position of the spool 50 relative to the housing 52 is controlled by the pressure drop across the fixed area control orifice 34.

The power steering motor assembly 12 may be of the well known integral type and includes a housing 70 which encloses a piston 72. The piston 72 cooperates with the housing 70 to define a head end chamber 74 and a rod end chamber 76. The steering control valve 18 controls fluid flow to and from the head and rod end chambers 74 and 76 in a known manner in response to rotation of the input shaft 20. Fluid discharged from the power steering motor assembly 12 is conducted to the reservoir 26.

The piston 72 has a linear array 78 of rack teeth which are disposed in meshing engagement with an arcuate array of pinion teeth 80. The pinion teeth 80 are disposed on a sector gear 82 which is connected with a steering linkage 84. The power steering motor assembly 12 has a known construction which is generally similar to the construction of the power steering motor assembly disclosed in U.S. Pat. No. 6,546, 322. Of course, the power steering motor assembly may have a different type of construction if desired.

When the speed of the engine 36 decreases, the pressure drop across the control orifice 34 also decreases due to the reduced flow of fluid from the first pump 22. The spool 50 of the valve 44 moves upward, as viewed in FIG. 1, in response to the relatively low pressure drop across the control orifice 34. As the spool 50 moves upward, the flow of fluid through the conduit 60 increases and the flow of fluid through the conduit 64 to reservoir 26 decreases. Therefore, the flow of fluid from the second pump 38 to the power steering motor assembly 12 increases when the speed of the engine 36 decreases. The combined flow of fluid from the first and second pumps 24, 38 supplies fluid to the power steering motor assembly to turn the steerable vehicle wheels 14 and 16. When the speed of the engine 36 is below a first predetermined speed, such as when the vehicle is conducting parking and similar maneuvers, the entire flow of fluid from the second pump 38 is directed to the power steering motor assembly 12.

When the speed of the engine 36 increases, the pressure drop across the control orifice 34 increases. The spool 50 of the valve 44 moves downward, as viewed in FIG. 1, in response to the relatively high pressure drop across the control orifice 34. As the spool 50 moves downward, the flow of fluid through the conduit 60 decreases and the flow of fluid through the conduit 64 to reservoir 26 increases. Therefore, the flow of fluid from the second pump 38 to the power steering motor assembly 12 decreases when the speed of the engine 36 increases. When the speed of the engine 36 is above a second predetermined speed, such as when the vehicle is cruising at highway speeds, the valve 44 directs the entire flow of fluid from the second pump 38 to the reservoir 26. Therefore, the first pump 22 may be sized so that when the engine 36 is operating at a speed above the second predetermined speed, the output from the first pump 22 is sufficient to supply the power steering motor assembly 12 to steer the vehicle wheels 14, 16. Thus, the first pump 22 may be a smaller size than the second pump 38.

Figure 2:
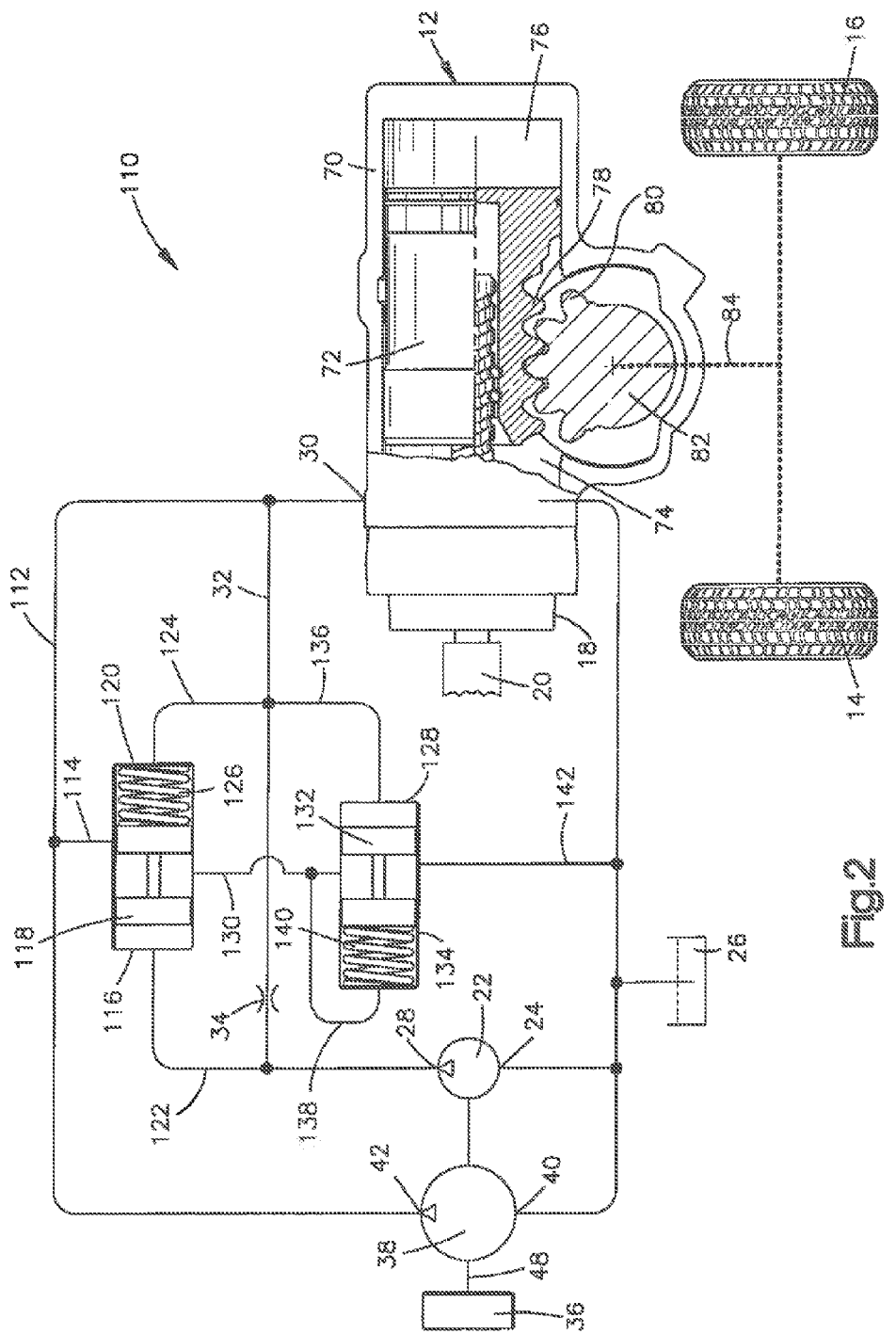
FIG. 2 is a schematic illustration of a second exemplary embodiment of a power steering apparatus constructed and operated in accordance with the present invention.

A second exemplary embodiment of a vehicle steering apparatus constructed in accordance with the present invention is illustrated in FIG. 2. The steering apparatus of FIG. 2 is generally similar to the steering apparatus of FIG. 1. Accordingly, similar numerals will be used to describe similar components.

The exemplary steering apparatus 110 illustrated in FIG. 2 includes a first pump 22 having a fluid input 24 connected in fluid communication with the fluid reservoir 26. A fluid output 28 of the first pump 22 is connected in fluid communication with the fluid inlet 30 of the steering control valve 18 by a fluid supply conduit 32. The fluid output 28 is in fluid communication with an upstream side of a fixed area control orifice 34 in the fluid supply conduit 32. The first pump 22 is continuously driven by the engine 36 of the vehicle, during operation of the engine. Therefore, during operation of the engine 36, the pump 22 continuously supplies fluid under pressure to the power steering motor assembly 12.

A second pump 38 has a fluid input 40 connected in fluid communication with the fluid reservoir 26. A fluid output 42 of the second pump 38 is connected in fluid communication with the fluid inlet 30 of the steering control valve 18 by a fluid supply conduit 112. The second pump 38 is continuously driven by the engine 36 of the vehicle, during operation of the engine. It is contemplated that the first and second pumps 22 and 38 may be mounted on the same output shaft 48 of the engine 36. Therefore, the first and second pumps 22 and 38 are driven at the same speed, which is the speed of the engine 36.

A conduit 114 directs fluid from the conduit 112 to a first valve 116. A valve spool 118 moves in a housing 120 of the first valve 116 under the influence of fluid pressure conducted from an upstream side of the control orifice 34 by a conduit 122. Similarly, the valve spool 118 moves in the housing 120 under the influence of fluid pressure conducted from a downstream side of the control orifice 34 by a conduit 124. The fluid pressure conducted through the conduit 124 and applied to the right (as viewed in FIG. 2) end portion of the valve spool 118, is assisted by a biasing spring 126 disposed between a right end portion of the housing 120 and the valve spool.

The first valve 116 directs fluid from the second pump 38 to a second valve 128 through a conduit 130. A valve spool 132 moves in a housing 134 of the second valve 128 under the influence of fluid pressure conducted from the downstream side of the control orifice 34 by a conduit 136. Similarly, the valve spool 132 moves in the housing 134 under the influence of fluid pressure conducted from the conduit 130 through conduit 138. The fluid pressure conducted through the conduit 138 and applied to the left (as viewed in FIG. 2) end portion of the valve spool 132, is assisted by a biasing spring 140 disposed between a left end portion of the housing 134 and the valve spool.

The second valve 128 directs fluid from the first valve 116 and, therefore, the second pump 38 to the reservoir 26 through a conduit 142. The amount of fluid directed from the second pump 38 to the control valve 18 and the reservoir 26 is determined by the positions of the spools 118 and 132 in the housings 120 and 134 of the first and second valves 116 and 128. The position of the spool 118 relative to the housing 120 of the first valve 116 is controlled by the pressure drop across the fixed area control orifice 34. Therefore, the first valve 116 is controlled by the speed of the engine 36. The position of the spool 132 relative to the housing 134 of the second valve 128 is generally controlled by the pressure difference between the downstream side of the control orifice 34 and the pressure in the conduit 130. Therefore, the second valve 128 is generally controlled by the pressure drop across the valve 116 which is generally a function of the steering demand from the control valve 18.

When the speed of the engine 36 decreases, the pressure drop across the fixed area control orifice 34 decreases. The spool 118 of the first valve 116 moves to the left, as viewed in FIG. 2, in response to the relatively low pressure drop across the control orifice 34. As the spool 118 moves to the left, the flow of fluid through the conduit 130 decreases and the flow of fluid through the conduit 112 to the control valve 18 increases. Therefore, the flow of fluid from the second pump 38 to the power steering motor assembly 12 increases when the speed of the engine 36 decreases. The combined flow of fluid from the first and second pumps 22, 38 supplies fluid to the power steering motor assembly to turn the steerable vehicle wheels 14 and 16. When the speed of the engine 36 is below a first predetermined speed, such as when the vehicle is conducting parking and similar maneuvers, the entire flow of fluid from the second pump 38 is directed to the power steering motor assembly 12.

When the input shaft 20 rotates in response to a steering demand, the pressure drop across the first valve 116 increases. Therefore, the spool 132 of the second valve 128 moves to the left, as viewed in FIG. 2, to decrease the flow of fluid from the first valve 116 to the reservoir 26. Once the pressure drop across the first valve 116 decreases, the spool 132 of the second valve 128 moves to the right to increase the flow of fluid from the first valve 116 to the reservoir 26. In this way, the second valve 128 maintains a constant pressure drop across the first valve 116.

When the speed of the engine 36 increases, the pressure drop across the fixed area control orifice 34 increases. The spool 118 of the first valve 116 moves toward the right, as viewed in FIG. 2, in response to the relatively high pressure drop across the control orifice 34. As the spool 118 moves toward the right, the flow of fluid through the conduit 112 decreases and the flow of fluid through the conduit 130 to reservoir 26 increases. Therefore, the flow of fluid from the second pump 38 to the power steering motor assembly 12 decreases when the speed of the engine 36 increases. When the speed of the engine 36 is above a second predetermined speed, such as when the vehicle is cruising at highway speeds, the entire flow of fluid from the second pump 38 is directed to the second valve 128. Therefore, the first pump 22 is sized so that when the engine 36 is operating at a speed above the second predetermined speed, the output from the first pump 22 is sufficient to supply the power steering motor assembly 12. Thus, the first pump 22 may be a smaller size than the second pump 38.

Figure 3:
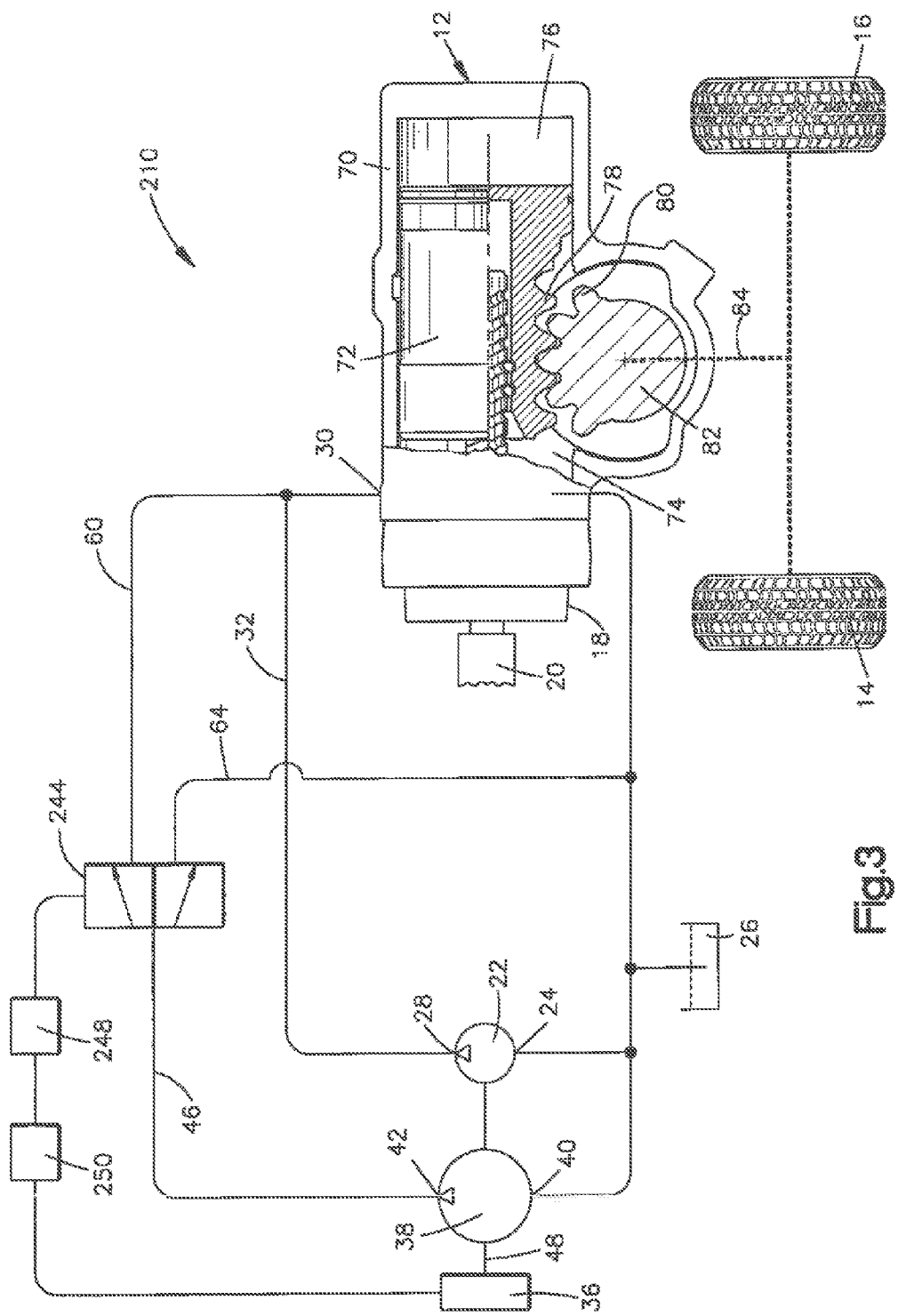
FIG. 3 is a schematic illustration of a third exemplary embodiment of a power steering apparatus constructed and operated in accordance with the present invention.

Another exemplary embodiment of a vehicle steering apparatus constructed in accordance with the present invention is illustrated in FIG. 3. The steering apparatus of FIG. 3 is generally similar to the steering apparatus of FIG. 1. Accordingly, similar numerals will be used to describe similar components.

The exemplary steering apparatus 210 illustrated in FIG. 3 includes a first pump 22 having a fluid input 24 connected in fluid communication with a fluid reservoir 26. A fluid output 28 of the first pump 22 is connected in fluid communication with a fluid inlet 30 of the steering control valve 18 by a fluid supply conduit 32. The first pump 22 is continuously driven by an engine 36 of the vehicle, during operation of the engine. Therefore, during operation of the engine 36, the pump 22 continuously supplies fluid under pressure to the power steering motor assembly 12.

A second pump 38 has a fluid input 40 connected in fluid communication with the fluid reservoir 26. A fluid output 42 of the second pump 38 is connected in fluid communication with a valve 244 by a conduit 46. The second pump 38 is continuously driven by the engine 36 of the vehicle, during operation of the engine. It is contemplated that the first and second pumps 22 and 38 may be mounted on the same output shaft 48 of the engine 36. Therefore, the first and second pumps 22 and 38 are driven at the same speed, which is the speed of the engine 36.

A controller 248 electrically controls the position of the valve 244. The controller 248 receives a signal from a sensor 250. The sensor 250 senses the speed of the engine 36. The controller moves the valve 244 in response to changes in the speed of the engine 36. It is contemplated that the controller may also receive signals from a vehicle speed sensor and/or a sensor for sensing the flow of fluid to the power steering motor assembly 12 for use in controlling the valve 244.

The valve 244 directs fluid from the second pump 38 to the fluid inlet 30 of the steering control valve 18 through a conduit 60. The valve 244 also directs fluid from the second pump 38 to the reservoir 26 through a conduit 64. The amount of fluid directed to the control valve 18 and the reservoir 26 is determined by the position of the valve 244. The position of the valve 244 is controlled by the controller 248. The controller 248 moves the valve 244 in response to the speed of the engine 36 sensed by the sensor 250.

When the speed of the engine 36 decreases, the controller 248 moves the valve 244 to increase the flow of fluid through the conduit 60 and decrease the flow of fluid through the conduit 64 to reservoir 26. Therefore, the flow of fluid from the second pump 38 to the power steering motor assembly 12 increases when the speed of the engine 36 decreases. The combined flow of fluid from the first and second pumps 22, 38 supplies fluid to the power steering motor assembly 12 to turn the steerable vehicle wheels 14 and 16. When the speed of the engine 36 is below a first predetermined speed, such as when the vehicle is conducting parking and similar maneuvers, the controller 248 moves the valve 244 so that the entire flow of fluid from the second pump 38 is directed to the power steering motor assembly.

When the speed of the engine 36 increases, the controller 248 moves the valve 244 to decrease the flow of fluid through the conduit 60 and increase the flow of fluid through the conduit 64 to reservoir 26. Therefore, the flow of fluid from the second pump 38 to the power steering motor assembly 12 decreases when the speed of the engine 36 increases. When the speed of the engine 36 is above a second predetermined speed, such as when the vehicle is cruising at highway speeds, the controller 248 moves the valve 244 so that the entire flow of fluid from the second pump 38 is directed to the reservoir 26. Therefore, the first pump 22 is sized so that when the engine 36 is operating at a speed above the second predetermined speed, the output from the first pump 22 is sufficient to supply the power steering motor assembly 12. Thus, the first pump 22 may be smaller than the second pump 38.

Figure 4:
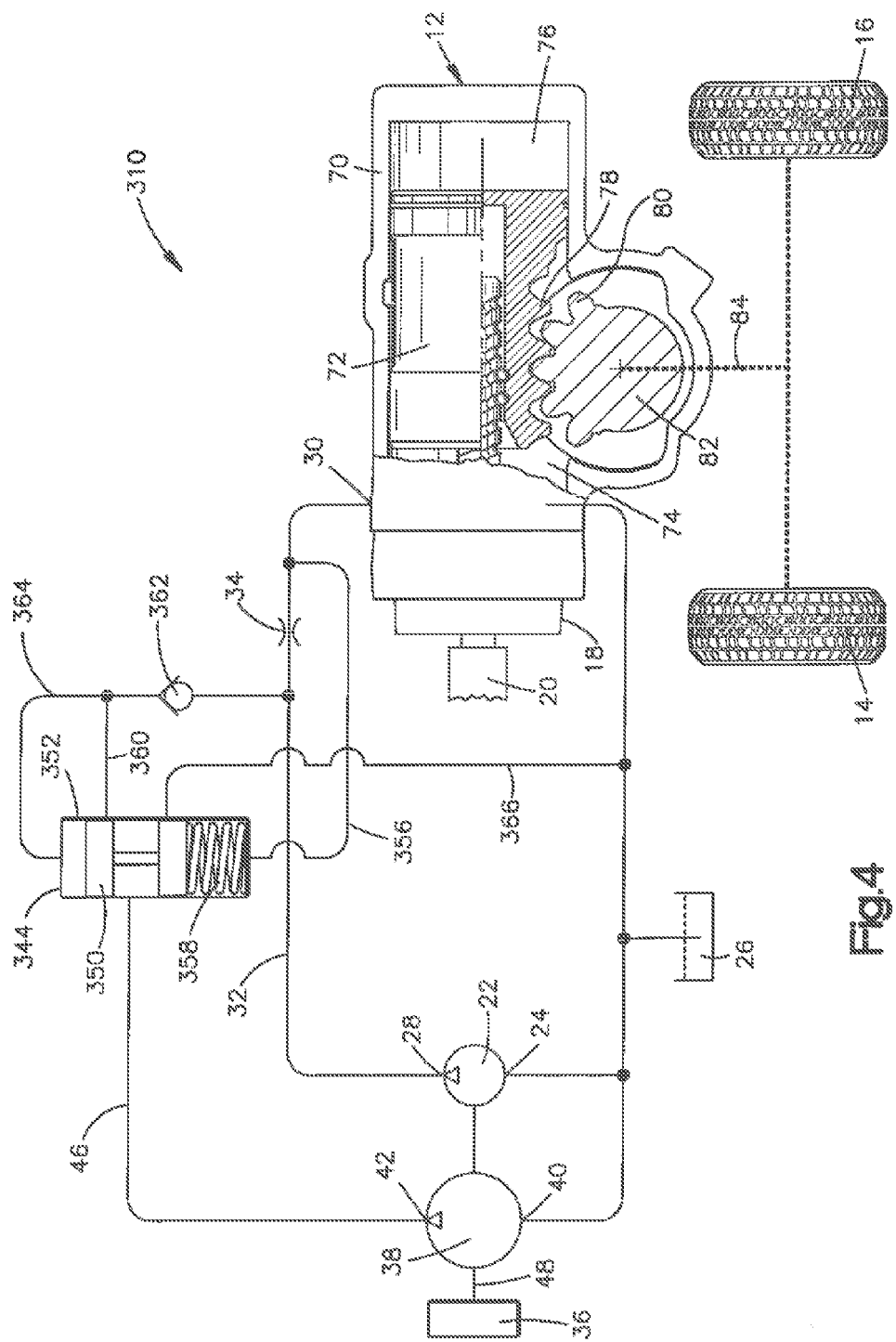
FIG. 4 is a schematic illustration of a fourth exemplary embodiment of a power steering apparatus constructed and operated in accordance with the present invention.

Another exemplary embodiment of a vehicle steering apparatus constructed in accordance with the present invention is illustrated in FIG. 4. The steering apparatus of FIG. 4 is generally similar to the steering apparatus of FIG. 1. Accordingly, similar numerals will be used to describe similar components.

The exemplary steering apparatus 310 illustrated in FIG. 4 includes a first pump 22 having a fluid input 24 connected in fluid communication with a fluid reservoir 26. A fluid output 28 of the first pump 22 is connected in fluid communication with a fluid inlet 30 of the steering control valve 18 by a fluid supply conduit 32. The fluid output 28 is in fluid communication with an upstream side of a fixed area control orifice 34 in the fluid supply conduit 32. The first pump 22 is continuously driven by an engine 36 of the vehicle, during operation of the engine. Therefore, during operation of the engine 36, the pump 22 continuously supplies fluid under pressure to the power steering motor assembly 12.

A second pump 38 has a fluid input 40 connected in fluid communication with the fluid reservoir 26. A fluid output 42 of the second pump 38 is connected in fluid communication with a valve 344 by a conduit 46. The second pump 38 is continuously driven by the engine 36 of the vehicle, during operation of the engine. It is contemplated that the first and second pumps 22 and 38 may be mounted on the same output shaft 48 of the engine 36. Therefore, the first and second pumps 22 and 38 are driven at the same speed, which is the speed of the engine 36.

A valve spool 350 moves in a housing 352 of the valve 344 under the influence of fluid pressure conducted from a downstream side of the control orifice 34 by a conduit 356. The fluid pressure conducted through the conduit 356 and applied to the lower (as viewed in FIG. 4) end portion of the valve spool 350, is assisted by a biasing spring 358 disposed between a lower end portion of the housing 352 and the valve spool.

The valve 344 directs fluid from the second pump 38 to the conduit 32 through a conduit 360. The conduit 360 includes a check valve 362. The conduit 360 directs fluid from the valve 344 to the upstream side of the control orifice 34. Therefore, the combined flow of fluid from the first pump 22 and the valve 344 passes through the control orifice 34.

The valve spool 350 also moves in the housing 352 of the valve 344 under the influence of pressure conducted from the conduit 360 to an upper (as viewed in FIG. 4) end portion of the valve spool 350 by a conduit 364. The valve 344 also directs fluid from the second pump 38 to the reservoir 26 through a conduit 366. The amount of fluid directed to the control valve 18 and the reservoir 26 is determined by the position of the spool 350 in the housing 352 of the valve 344. The position of the spool 350 relative to the housing 352 is controlled by the pressure drop across the fixed area control orifice 34. The valve 344 maintains a constant combined flow of fluid from the first and second pumps to 22 and 38 to the power steering motor assembly 12 since the fluid from both pumps flows through the control orifice 34.

When the speed of the engine 36 decreases, the pressure drop across the fixed area control orifice 34 decreases. The spool 350 of the valve 344 moves upward, as viewed in FIG. 4, in response to the relatively low pressure drop across the control orifice 34. As the spool 350 moves upward, the flow of fluid through the conduit 360 increases and the flow of fluid through the conduit 366 to reservoir 26 decreases. Therefore, the flow of fluid from the second pump 38 to the power steering motor assembly 12 increases when the speed of the engine 36 decreases. The combined flow of fluid from the first and second pumps 22, 38 supplies fluid to the power steering motor assembly through the control orifice 34 to turn the steerable vehicle wheels 14 and 16. When the speed of the engine 36 is below a first predetermined speed, such as when the vehicle is conducting parking and similar maneuvers, the valve 344 directs the entire flow of fluid from the second pump 38 to the power steering motor assembly 12.

When the speed of the engine 36 increases, the pressure drop across the control orifice 34 increases. The spool 350 of the valve 344 moves downward, as viewed in FIG. 4, in response to the relatively high pressure drop across the control orifice 34. As the spool 350 moves downward, the flow of fluid through the conduit 360 decreases and the flow of fluid through the conduit 366 to reservoir 26 increases. Therefore, the flow of fluid from the second pump 38 to the power steering motor assembly 12 decreases when the speed of the engine 36 increases. When the speed of the engine 36 is above a second predetermined speed, such as when the vehicle is cruising at highway speeds, the entire flow of fluid from the second pump 38 is directed to the reservoir 26. Therefore, the first pump 22 is sized so that when the engine 36 is operating at a speed above the second predetermined speed, the output from the first pump 22 is sufficient to supply the power steering motor assembly 12. Thus, the first pump 22 may be smaller than the second pump 38.

Figure 5:
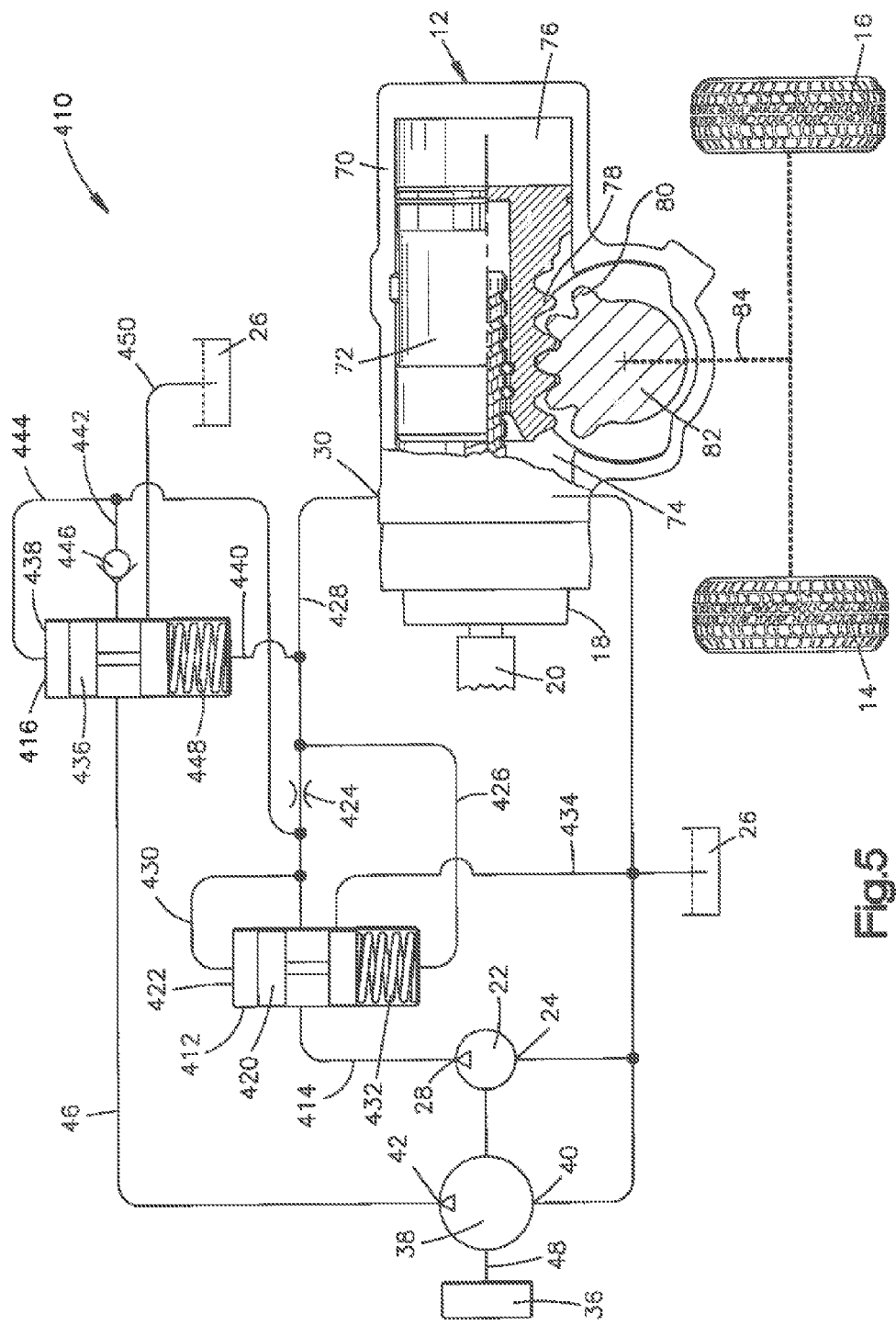
FIG. 5 is a schematic illustration of a fifth exemplary embodiment of a power steering apparatus constructed and operated in accordance with the present invention.

Another exemplary embodiment of a vehicle steering apparatus constructed in accordance with the present invention is illustrated in FIG. 5. The steering apparatus of FIG. 5 is generally similar to the steering apparatus of FIG. 1. Accordingly, similar numerals will be used to describe similar components.

The exemplary steering apparatus 410 illustrated in FIG. 5 includes a first pump 22 having a fluid input 24 connected in fluid communication with a fluid reservoir 26. A fluid output 28 of the first pump 22 is connected in fluid communication with a first valve 412 by a fluid supply conduit 414. The first pump 22 is continuously driven by an engine 36 of the vehicle, during operation of the engine. Therefore, during operation of the engine 36, the pump 22 continuously supplies fluid under pressure to the valve 412.

A second pump 38 has a fluid input 40 connected in fluid communication with the fluid reservoir 26. A fluid output 42 of the second pump 38 is connected in fluid communication with a second valve 416 by a conduit 46. The second pump 38 is continuously driven by the engine 36 of the vehicle, during operation of the engine. It is contemplated that the first and second pumps 22 and 38 may be mounted on the same output shaft 48 of the engine 36. Therefore, the first and second pumps 22 and 38 are driven at the same speed, which is the speed of the engine 36.

A valve spool 420 moves in a housing 422 of the first valve 412 under the influence of fluid pressure conducted from a downstream side of a fixed area control orifice 424 by a conduit 426. The control orifice 424 is located in a conduit 428 that conducts fluid from the valve 412 to the inlet 30 of the control valve 18. Similarly, the valve spool 420 moves in the housing 422 under the influence of fluid pressure conducted from an upstream side of the control orifice 424 by a conduit 430. The fluid pressure conducted through the conduit 426 and applied to the lower (as viewed in FIG. 5) end portion of the valve spool 420, is assisted by a biasing spring 432 disposed between a lower end portion of the housing 422 and the valve spool.

The valve 412 directs fluid from the first pump 22 to the fluid inlet 30 of the steering control valve 18 through the conduit 428. The valve 412 also directs fluid from the first pump 22 to the reservoir 26 through a conduit 434. The amount of fluid directed to the control valve 18 and the reservoir 26 is determined by the position of the spool 420 in the housing 422 of the valve 412. The position of the spool 420 relative to the housing 422 is controlled by the pressure drop across the control orifice 424.

A valve spool 436 moves in a housing 438 of the second valve 416 under the influence of fluid pressure conducted from a downstream side of a control orifice 424 by a conduit 440. Similarly, the valve spool 436 moves in the housing 438 under the influence of fluid pressure conducted from a conduit 442 by a conduit 444. The conduit 442 directs fluid from the second valve 416 to the upstream side of the control orifice 424. The conduit 442 includes a check valve 446. Therefore, the combined flow from the first and second valves 412 and 416 flows through the control orifice 424. The fluid pressure conducted through the conduit 440 and applied to the lower (as viewed in FIG. 5) end portion of the valve spool 436, is assisted by a biasing spring 448 disposed between a lower end portion of the housing 438 and the valve spool.

The second valve 416 directs fluid from the second pump 38 to the upstream side of the fixed area control orifice 424 in conduit 428. The valve 416 also directs fluid from the second pump 38 to the reservoir 26 through a conduit 450. The amount of fluid directed to the upstream side of the fixed area control orifice 424 and the reservoir 26 is determined by the position of the spool 436 in the housing 438 of the valve 416. The position of the spool 436 relative to the housing 438 is controlled by the pressure difference between the downstream side of the control orifice 424 and the pressure in the conduit 442 connected with the upstream side of the control orifice 424. Therefore, the position of the spool 436 is controlled by the pressure drop across the control orifice 424.

When the speed of the engine 36 decreases, the pressure drop across the fixed area control orifice 424 decreases. The spool 436 of the second valve 416 moves upward, as viewed in FIG. 5, in response to the relatively low pressure drop across the control orifice 424. As the spool 436 moves upward, the flow of fluid through the conduit 442 increases and the flow of fluid through the conduit 450 to reservoir 26 decreases. Therefore, the flow of fluid from the second pump 38 to the power steering motor assembly 12 increases when the speed of the engine 36 decreases. The combined flow of fluid from the first and second pumps 22, 38 supplies fluid to the power steering motor assembly through the control orifice 424 to turn the steerable vehicle wheels 14 and 16. When the speed of the engine 36 is below a first predetermined speed, such as when the vehicle is conducting parking and similar maneuvers, the valve 416 directs the entire flow of fluid from the second pump 38 to the power steering motor assembly 12.

When the speed of the engine 36 increases, the pressure drop across the control orifice 424 increases. The spool 436 of the second valve 416 moves downward, as viewed in FIG. 5, in response to the relatively high pressure drop across the control orifice 424. As the spool 436 moves downward, the flow of fluid through the conduit 442 decreases and the flow of fluid through the conduit 450 to reservoir 26 increases. Therefore, the flow of fluid from the second pump 38 to the power steering motor assembly 12 decreases when the speed of the engine 36 increases. When the speed of the engine 36 is above a second predetermined speed, such as when the vehicle is cruising at normal highway speeds, the entire flow of fluid from the second pump 38 is directed to the reservoir 26. Therefore, the first pump 22 is sized so that when the engine 36 is operating at a speed above the second predetermined speed, the output from the first pump 22 is sufficient to supply the power steering motor assembly 12. Thus, the first pump 22 may be smaller than the second pump 38.

When the speed of the engine 36 is above the second predetermined speed, the pressure drop across the control orifice 424 increases further. The spool 420 of the first valve 412 moves downward, as viewed in FIG. 5, in response to the high pressure drop across the control orifice 424. As the spool 420 moves downward, the flow of fluid through the conduit 428 decreases and the flow of fluid through the conduit 434 to reservoir 26 increases. Therefore, the flow of fluid from the first pump 22 to the power steering motor assembly 12 decreases when the speed of the engine is above the second predetermined speed. The first vale 422 is configured to direct fluid from the first pump 22 to the reservoir only when the speed of the engine is above the second predetermined speed, such as the cruising speed.

Figure 6:
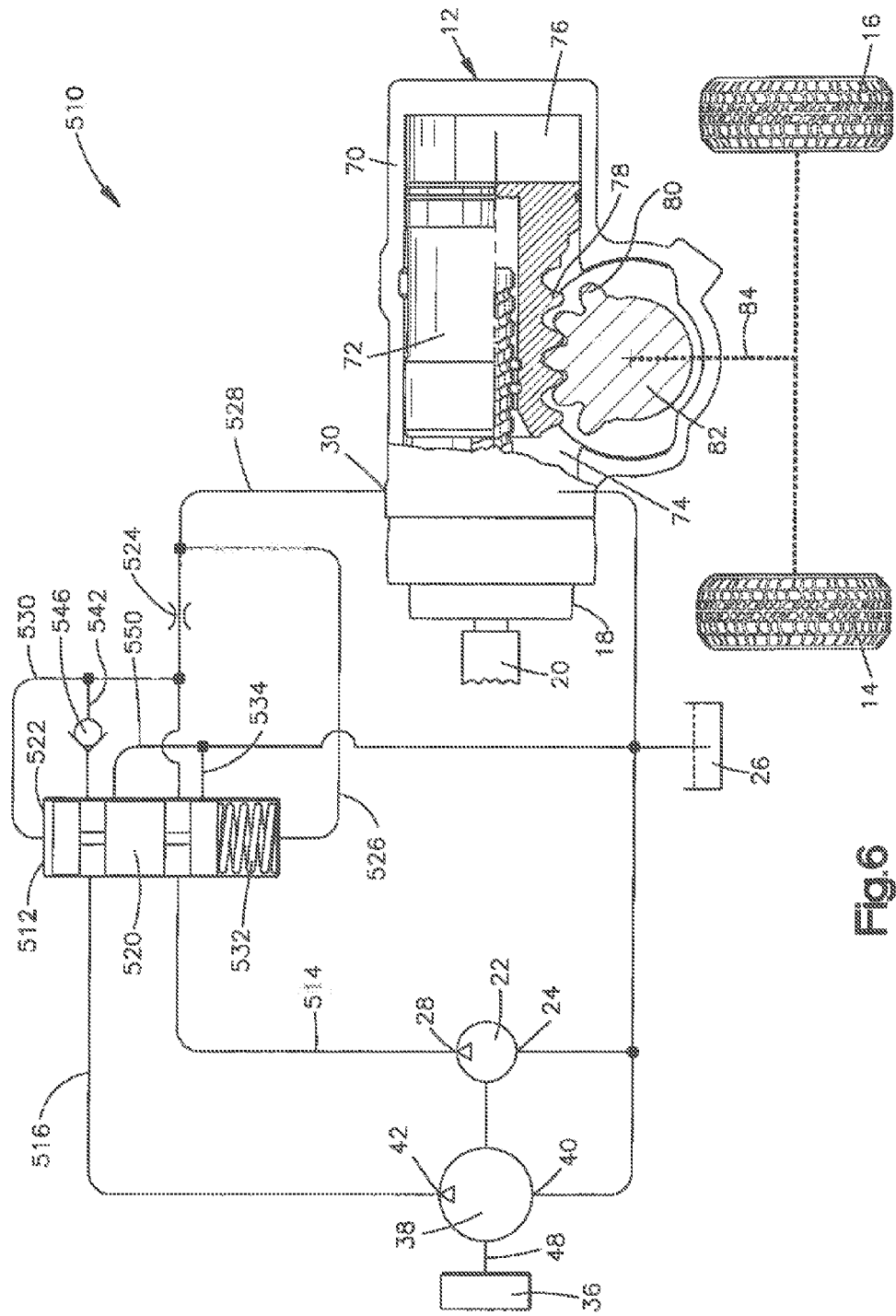
FIG. 6 is a schematic illustration of a sixth exemplary embodiment of a power steering apparatus constructed and operated in accordance with the present invention.

Another exemplary embodiment of a vehicle steering apparatus constructed in accordance with the present invention is illustrated in FIG. 6. The steering apparatus of FIG. 6 is generally similar to the steering apparatus of FIG. 1. Accordingly, similar numerals will be used to describe similar components.

The exemplary steering apparatus 510 illustrated in FIG. 6 includes a first pump 22 having a fluid input 24 connected in fluid communication with a fluid reservoir 26. A fluid output 28 of the first pump 22 is connected in fluid communication with a valve 512 by a conduit 514. The first pump 22 is continuously driven by an engine 36 of the vehicle, during operation of the engine. Therefore, during operation of the engine 36, the pump 22 continuously supplies fluid under pressure to the valve 512.

A second pump 38 has a fluid input 40 connected in fluid communication with the fluid reservoir 26. A fluid output 42 of the second pump 38 is connected in fluid communication with the valve 512 by a conduit 516. The second pump 38 is continuously driven by the engine 36 of the vehicle, during operation of the engine. It is contemplated that the first and second pumps 22 and 38 may be mounted on the same output shaft 48 of the engine 36. Therefore, the first and second pumps 22 and 38 are driven at the same speed, which is the speed of the engine 36.

A valve spool 520 moves in a housing 522 of the valve 512 under the influence of fluid pressure conducted from a downstream side of a fixed area control orifice 524 by a conduit 526. The control orifice 524 is located in a conduit 528 that conducts fluid from the valve 512 to the inlet 30 of the control valve 18. Similarly, the valve spool 520 moves in the housing 522 under the influence of fluid pressure conducted from an upstream side of the control orifice 524 by a conduit 530. The fluid pressure conducted through the conduit 526 and applied to the lower (as viewed in FIG. 6) end portion of the valve spool 520, is assisted by a biasing spring 532 disposed between a lower end portion of the housing 522 and the valve spool.

The valve 512 directs fluid from the first pump 22 to the fluid inlet 30 of the steering control valve 18 through the conduit 528. The valve 512 also directs fluid from the first pump 22 to the reservoir 26 through a conduit 534. A conduit 542 directs fluid from the valve 512 to the upstream side of the control orifice 524. The conduit 542 includes a check valve 546. The valve 512 directs fluid from the second pump 38 to the upstream side of the fixed area control orifice 524 in conduit 528 through the conduit 542. Therefore, flow from both the first and second pumps 22, 38 flows through the control orifice 524. The valve 512 also directs fluid from the second pump 38 to the reservoir 26 through a conduit 550. The amount of fluid directed to the control valve 18 and the reservoir 26 from the first and second pumps 22 and 38 is determined by the position of the spool 520 in the housing 522 of the valve 512. The position of the spool 520 relative to the housing 522 is controlled by the pressure drop across the fixed area control orifice 524.

When the speed of the engine 36 decreases, the pressure drop across the fixed area control orifice 524 decreases. The spool 520 of the valve 512 moves upward, as viewed in FIG. 6, in response to the relatively low pressure drop across the control orifice 524. As the spool 520 moves upward, the flow of fluid through the conduit 542 increases and the flow of fluid through the conduit 550 to reservoir 26 decreases. Therefore, the flow of fluid from the second pump 38 to the power steering motor assembly 12 increases when the speed of the engine 36 decreases. The combined flow of fluid from the first and second pumps 22, 38 supplies fluid to the power steering motor assembly through the control orifice 524 to turn the steerable vehicle wheels 14 and 16. When the speed of the engine 36 is below a first predetermined speed, such as when the vehicle is conducting parking and similar maneuvers, the valve 512 directs the entire flow of fluid from the first and second pumps 22 and 38 to the power steering motor assembly 12.

When the speed of the engine 36 increases, the pressure drop across the control orifice 524 increases. The spool 520 of the valve 512 moves downward, as viewed in FIG. 6, in response to the relatively high pressure drop across the control orifice 524. As the spool 520 moves downward, the flow of fluid through the conduit 542 decreases and the flow of fluid through the conduit 550 to reservoir 26 increases. Therefore, the flow of fluid from the second pump 38 to the power steering motor assembly 12 decreases when the speed of the engine 36 increases. When the speed of the engine 36 is above a second predetermined speed, such as when the vehicle is cruising at normal highway speeds, the entire flow of fluid from the second pump 38 is directed to the reservoir 26. Therefore, the first pump 22 is sized so that when the engine 36 is operating at a speed above the second predetermined speed, the output from the first pump 22 is sufficient to supply the power steering motor assembly 12. Thus, the first pump 22 may be smaller than the second pump 38.

When the speed of the engine 36 is above the second predetermined speed, the pressure drop across the control orifice 524 increases further. The spool 520 of the valve 512 moves downward, as viewed in FIG. 6, in response to the high pressure drop across the control orifice 524. As the spool 520 moves downward, the flow of fluid through the conduit 528 decreases and the flow of fluid through the conduit 534 to reservoir 26 increases. Therefore, the flow of fluid from the first pump 22 to the power steering motor assembly 12 decreases when the speed of the engine is above the second predetermined speed. The valve 512 is configured to direct fluid from the first pump 22 to the reservoir only when the speed of the engine is above the second predetermined speed. When the speed of the engine is at or below the second predetermined speed, the valve 512 directs the entire flow of fluid from the first pump 22 to the power steering motor assembly 12.

Figure 7:
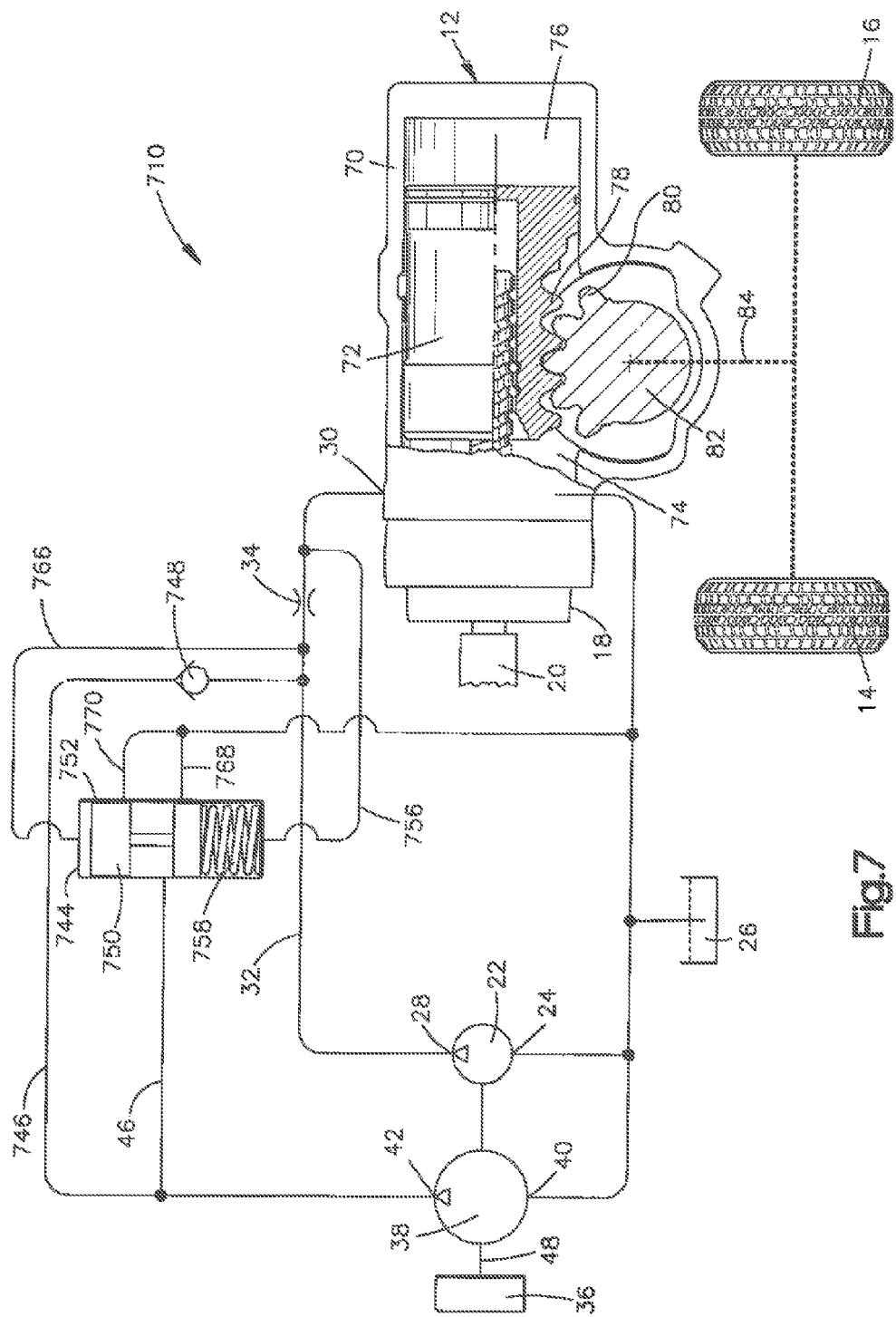
FIG. 7 is a schematic illustration of a seventh exemplary embodiment of a power steering apparatus as constructed and operated in accordance with the present invention.

Another exemplary embodiment of a vehicle steering apparatus constructed in accordance with the present invention is illustrated in FIG. 7. The steering apparatus of FIG. 7 is generally similar to the steering apparatus of FIG. 1. Accordingly, similar numerals will be used to describe similar components.

The exemplary steering apparatus 710 illustrated in FIG. 7 includes a first pump 22 having a fluid input 24 connected in fluid communication with a fluid reservoir 26. A fluid output 28 of the first pump 22 is connected in fluid communication with a fluid inlet 30 of the steering control valve 18 by a fluid supply conduit 32. The fluid output 28 is in fluid communication with an upstream side of a fixed area control orifice 34 in the fluid supply conduit 32. The first pump 22 is continuously driven by an engine 36 of the vehicle, during operation of the engine. Therefore, during operation of the engine 36, the pump 22 continuously supplies fluid under pressure to the power steering motor assembly 12.

A second pump 38 has a fluid input 40 connected in fluid communication with the fluid reservoir 26. A fluid output 42 of the second pump 38 is connected in fluid communication with a valve 744 by a conduit 46. The fluid output 42 of the second pump 38 is also connected in fluid communication with the supply conduit 32 at an upstream side of the control orifice 34 by a conduit 746. The conduit 746 includes a check valve 748. Therefore, the combined flow of fluid from the first pump 22 and the flow from the second pump 38 that does not pass through valve 744 passes through the control orifice 34.

The second pump 38 is continuously driven by the engine 36 of the vehicle, during operation of the engine. Therefore, during operation of the engine 36, the pump 38 continuously supplies fluid under pressure to the power steering motor assembly 12. It is contemplated that the first and second pumps 22 and 38 may be mounted on the same output shaft 48 of the engine 36. Therefore, the first and second pumps 22 and 38 are driven at the same speed, which is the speed of the engine 36.

A valve spool 750 moves in a housing 752 of the valve 744 under the influence of fluid pressure conducted from a downstream side of the control orifice 34 by a conduit 756. The fluid pressure conducted through the conduit 756 and applied to the lower (as viewed in FIG. 7) end portion of the valve spool 750, is assisted by a biasing spring 758 disposed between a lower end portion of the housing 752 and the valve spool.

The valve spool 750 also moves in the housing 752 of the valve 744 under the influence of pressure conducted from the upstream side of the control orifice 34 in the conduit 32 to an upper (as viewed in FIG. 7) end portion of the valve spool 750 by a conduit 766. The conduit 766 conducts fluid from the upstream side of the control orifice 34 and downstream of the intersection of the conduit 746 and the conduit 32. Therefore, the conduit 766 conducts fluid from both of the first and second pumps 22, 38 to the upper end portion of the housing 752.

The valve 744 directs fluid from the conduit 46o the reservoir 26 through a conduit 768. The valve 744 also directs fluid from the conduit 766 to the reservoir 26 through a conduit 770. The amount of fluid directed to the control valve 18 and the reservoir 26 from the first and second pumps 22, 38 is determined by the position of the spool 750 in the housing 752 of the valve 744. The position of the spool 750 relative to the housing 752 is controlled by the pressure drop across the fixed area control orifice 34.

When the speed of the engine 36 decreases, the pressure drop across the fixed area control orifice 34 decreases. The spool 750 of the valve 744 moves upward, as viewed in FIG. 7, in response to the relatively low pressure drop across the control orifice 34. As the spool 750 moves upward, the flow of fluid through the conduits 768 and 770 to reservoir 26 decreases and the flow of fluid from the second pump 38 through the conduit 746 increases. Therefore, the flow of fluid from the first and second pumps 22, 38 to the power steering motor assembly 12 increases when the speed of the engine 36 decreases. The combined flow of fluid from the first and second pumps 22, 38 supplies fluid to the power steering motor assembly through the control orifice 34 to turn the steerable vehicle wheels 14 and 16. When the speed of the engine 36 is below a first predetermined speed, such as when the vehicle is conducting parking and similar maneuvers, the valve 744 prevents any flow of fluid from the conduits 46, 766 to the reservoir 26 and directs the entire flow of fluid from the first and second pumps 22 and 38 to the power steering motor assembly 12.

When the speed of the engine 36 increases, the pressure drop across the control orifice 34 increases. The spool 750 of the valve 744 moves downward, as viewed in FIG. 7, in response to the relatively high pressure drop across the control orifice 34. As the spool 750 moves downward, the flow of fluid from the conduit 46 to the reservoir 26 increases and the flow of fluid from the second pump through the conduit 746 decreases. The flow of fluid through the conduit 766 to reservoir 26 may also increase. Therefore, the flow of fluid from the first and second pumps 22, 38 to the power steering motor assembly 12 decreases when the speed of the engine 36 increases.

When the speed of the engine 36 is above a second predetermined speed, such as when the vehicle is cruising at normal highway speeds, the spool 750 moves further downward. The flow of fluid from the conduit 46 to the reservoir 26 increases and the flow of fluid from the second pump 38 through the conduit 746 decreases. Also, the flow of fluid through the conduit 766 to the reservoir 26 increases further. Therefore, the flow of fluid from the first and second pumps 22, 38 to power steering motor assembly 12 decreases.

Figure 8:
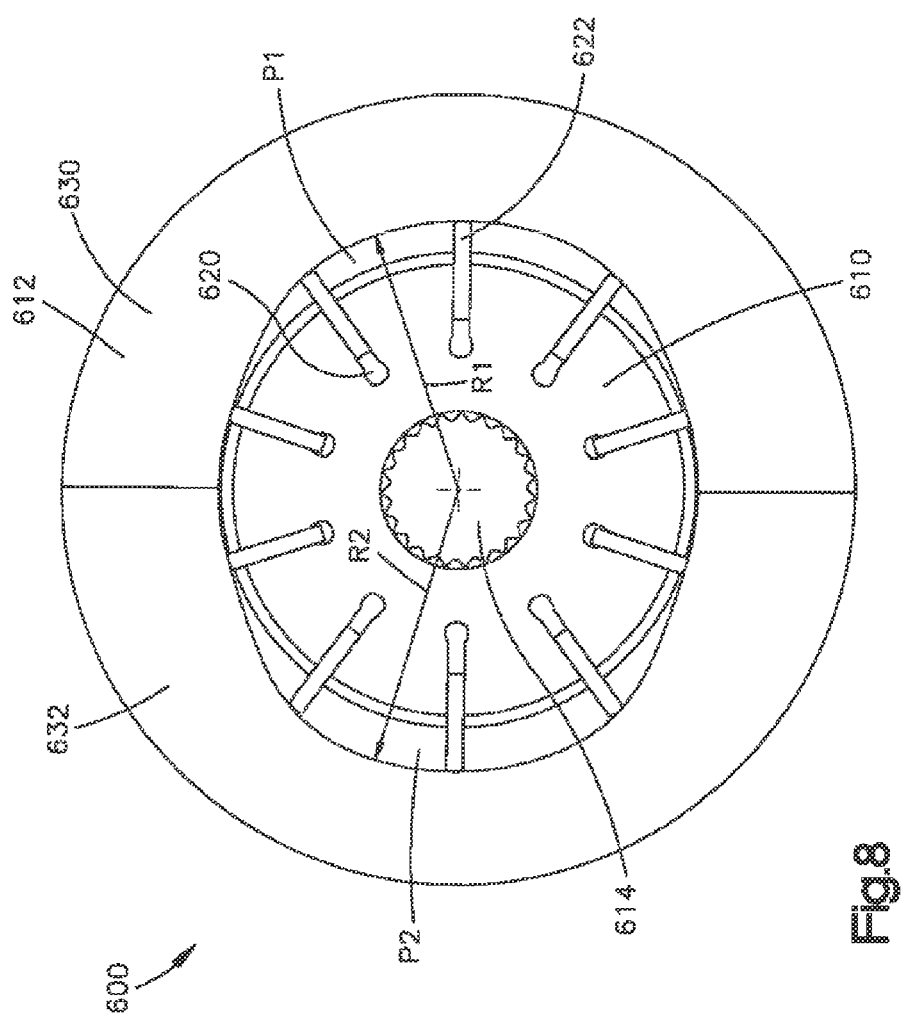
FIG. 8 is a schematic illustration of an exemplary pump for use in any of the previous exemplary embodiments.

An exemplary embodiment of a pumping mechanism 600 to be used in any one of the vehicle steering apparatuses described in FIGS. 1-7 is illustrated in FIG. 8. The pumping mechanism 600 includes a rotor 610 and a cam ring 612. The rotor 610 is connected with an input shaft 614. The rotor 610 and input shaft 614 rotate together relative to the cam ring 612. The input shaft 614 may be connected with the output shaft 48 of the engine 36. It is contemplated that the rotor 610 may be connected to the output shaft 48. Therefore, the rotor 610 rotates at the same speed as the engine. 36.

The rotor 610 includes a plurality of radial slits 620. Vanes 622 are located in the slits 620. The bottoms of the slits 620 receive fluid pressure to move the vanes into engagement with the cam ring 612. Therefore, the vanes 622 define a plurality of pumping chambers located between the vanes.

The cam ring 612 includes a first generally semicircular portion 630 connected to a second generally semicircular portion 632. The first semicircular portion 630 has a first interior elliptical surface. The first interior elliptical surface is spaced from a center of the rotor 610 a first distance R1. The space between the first interior elliptical surface and the rotor 610 defines a first pumping area P1. The second semicircular portion 632 has a second interior elliptical surface. The second interior elliptical surface is spaced from a center of the rotor 610 a second distance R2. The space between the second interior elliptical surface and the rotor 610 defines a second pumping area P2. The distance R2 is larger than the distance R1. Each of the pumping areas P1 and P2 has an inlet and an outlet. Therefore, during rotation of the rotor 610 relative to the cam ring 612, the pumping area P1 pumps less fluid than the pumping area P2. It is contemplated that the first and second semicircular portions 630 and 632 could be formed as one piece.

The pumping area P1 may be used as the first pump 22 in the vehicle steering apparatuses of FIGS. 1-6 and the pumping area P2 may be used as the second pump 38. It is contemplated that the first pumping area P1 may provide ⅓ of the flow required by the steering apparatus for parking maneuvers at engine speeds below the first predetermined speed and the second pumping area may provide ⅔ of the flow required by the steering apparatus for parking maneuvers at engine speeds below the first predetermined speed.

From the above description of the invention, those skilled in the art will perceive applications, improvements, changes and modifications to the present invention. Such applications, improvements, changes and modifications within the skill of the art are intended to be covered by the appended claims.

Having described the invention, the following is claimed:

1. An apparatus for use in turning steerable vehicle wheels, said apparatus comprising:
    a power steering motor assembly connected with the steerable vehicle wheels, the power steering motor assembly having a steering control valve with a fluid inlet and a power steering motor with first and second chambers, the steering control valve moving in response to rotation of an input shaft to control fluid flow to and from the first and second chambers of the power steering motor to move a piston of the power steering motor, the steering control valve directing fluid from the fluid inlet to one of the first and second chambers and directing fluid from another of the first and second chambers to a reservoir in response to rotation of the input shaft;
    a first pump connected in fluid communication with the fluid inlet of the steering control valve of the power steering motor assembly and continuously driven by an engine of the vehicle, during operation of the engine, to continuously supply fluid under pressure to the fluid inlet of the steering control valve during operation of the engine;
    a second pump connected in fluid communication with the fluid inlet of the steering control valve and continuously driven by the engine of the vehicle, during operation of the engine;
    a first valve connected in fluid communication with the fluid inlet of the steering control valve and the second pump, the first valve directing fluid flow from the second pump to at least one of the fluid inlet of the steering control valve and reservoir during operation of both the first pump and the second pump; and
    a fixed area control orifice located in a conduit conducting fluid from the first and second pumps to the fluid inlet of the steering control valve, a pressure at an upstream side of the fixed area control orifice urges the first valve to decrease the flow of fluid from the first and second pumps to the fluid inlet of the steering control valve and increase the flow of fluid from the first and second pumps to the reservoir, a pressure at a downstream side of the fixed area control orifice urges the first valve to increase the flow of fluid from the first and second pumps to the fluid inlet of the steering control valve and decrease the flow of fluid from the first and second pumps to the reservoir.

2. An apparatus as set forth in claim 1 wherein the first valve directs fluid flow from the second pump to the fluid inlet of the steering control valve in response to a decrease in speed of the engine.

3. An apparatus as set forth in claim 1 wherein the first valve directs fluid flow from the second pump to the fluid inlet of the steering control valve in response to a decrease in flow from the first pump.

4. An apparatus as set forth in claim 1 wherein the first valve directs fluid flow from the second pump to the reservoir in response to an increase in speed of the engine.

5. An apparatus as set forth in claim 1 wherein the first valve directs fluid flow from the second pump to the reservoir in response to an increase in flow from the first pump.

6. An apparatus as set forth in claim 1 wherein a pumping mechanism includes a first pumping area defining the first pump and a second pumping area defining the second pump, the first pumping area being smaller than the second pumping area.

7. An apparatus as set forth in claim 6 wherein the first pump is sized to provide a flow required by the power steering motor assembly when the engine speed is above a first predetermined speed corresponding to the vehicle cruising at highway speed, the second pump being sized so that the combined flow of the first and second pumps provides a required flow to the power steering motor assembly when the engine speed is below a second predetermined speed corresponding to the vehicle conducting parking and similar maneuvers.

8. An apparatus as set forth in claim 6 wherein the pumping mechanism includes a rotor and a cam ring having a first generally semicircular portion with a first interior elliptical surface and a second generally semicircular portion with a second interior elliptical surface, a furthest point of the second interior elliptical surface being spaced from the rotor a larger distance than a furthest point of the first interior elliptical surface.

9. An apparatus as set forth in claim 8 wherein the pumping mechanism includes vanes located in slits of the rotor which is connected with the engine, the vanes engaging the first and second semicircular portions to define pumping chambers.

10. An apparatus as set forth in claim 1 wherein the first and second pumps are mounted on the same shaft.

11. An apparatus as set forth in claim 1 wherein the second pump discharges fluid at a greater rate than the first pump when the first and second pumps are being driven at the same speed.

12. An apparatus as set forth in claim 1 wherein a spring urges the first valve to increase the flow of fluid from the first and second pumps to the fluid inlet of the steering control valve and decrease the flow of fluid from the first and second pumps to the reservoir.

13. An apparatus as set forth in claim 1 wherein the conduit conducts fluid from the second pump to the fluid inlet of the steering control valve, fluid flow from the first pump and the second pump passing through the fixed area control orifice.

* * * * *